United States Patent [19]

Tsai et al.

[11] 4,256,173
[45] Mar. 17, 1981

[54] TWO REGENERATOR-FLUE SYSTEM FOR REGENERATIVE FURNACES

[75] Inventors: Yih-Wan Tsai, Pittsburgh; Robert H. Duffus, Kitanning, both of Pa.

[73] Assignee: PPG Industries, Inc., Pittsburgh, Pa.

[21] Appl. No.: 25,140

[22] Filed: Mar. 29, 1979

[51] Int. Cl.³ .............................................. F28D 17/04
[52] U.S. Cl. ........................................ 165/9.3; 65/337
[58] Field of Search ............................. 165/9.1–9.4; 65/337

[56] References Cited

U.S. PATENT DOCUMENTS

| 1,836,412 | 12/1931 | Trinks | 165/9.2 |
| 2,768,822 | 10/1956 | Frey | 165/9.3 |

FOREIGN PATENT DOCUMENTS

| 191206 | 1/1923 | United Kingdom | 165/9.2 |

Primary Examiner—Albert W. Davis
Attorney, Agent, or Firm—Dennis G. Millman; Paul A. Leipold

[57] ABSTRACT

In a regenerative furnace of the type used for melting glass, localized overheating of the regenerating regenerator packing is minimized and heating of the regenerator packing is made more uniform by the utilization of a second flue. The first flue passage is in continuous contact with the regenerative packing while the second passage is joined to said first passage at points at each end of the regenerative packing. Further, there are flow control dampers located in said first passageway between the regenerative packing and the joining point of the second bypass flue and another damper in the bypass flue itself to regulate the passage of hot gas to and from the regenerative packing so that the packing is evenly heated or cooled.

4 Claims, 11 Drawing Figures

Fig. 1A

Prior Art

|  | PORT #1 | CROWN T.C. 2850°F #2 | #3 | #4 | #5 | #6 | #7 | |
|---|---|---|---|---|---|---|---|---|
| COURSES TOP | | | 2861°F 2710°F | 2805°F 2610°F | 2791°F 2600°F | | 2690°F 2482°F | 2598°F 2378°F | (PEAK) (LOW) |
| 5 | | | | | | | | | |
| 10 | | 2715°F 2645°F | 2602°F 2570°F | 2550°F 2470°F | 18 | 2250°F 2122°F | | 2081°F | (PEAK) (LOW) |
| 15 | | | | | | | | | |
| 20 | | | 2305°F 2110°F | 2215°F 2065°F | 20 | 1920°F 1765°F | | 1751°F 1680°F | (PEAK) (LOW) |
| 25 | | | | | | | | | |
| 30 | | 2020°F (T.C.) | | 1700°F 1463°F | 23 | 1575°F 1435°F | | 1470°F 1408°F | (PEAK) (LOW) |
| 24 FLUE | | 1860°F 1505°F | | | | | | | |

Prior Art

FIG. 6

TWO REGENERATOR-FLUE SYSTEM FOR REGENERATIVE FURNACES

BACKGROUND OF THE INVENTION

This invention relates to regenerative furnaces and their operation, and in particular to the type of regenerative furnace commonly employed in the manufacture of flat glass. The invention particularly concerns the control of flow of gases through the flues to and from the checker packing material of the regenerators.

FIELD OF THE INVENTION

Because side fired flat glass furnaces typically include a relatively large number of burner ports (usually about four to eight on each side) spaced several feet apart from one another, the length of a regenerator bed associated therewith usually has a length which is several times greater than its width. And because of construction expediencies, the main flue carrying gases to and from each regenerator is usually located at one end of the regenerator. This arrangement unfortunately sets up lateral flow in the upper plenum and therefore an uneven flow distribution in the regenerator packing during the exhaust cycle, which has been found to cause the portion of the packing near the flue to become hotter than other portions of the packing. This localized overheating may often be reinforced in the subsequent firing cycle, during which the flow of incoming air has been detected favoring the end of the packing away from the flue so that the flue end is cooled less than the remainder of the packing. As a result, the flue end portion of the packing tends to deteriorate faster than others, thereby shortening furnace life. Furthermore, because the stored heat is concentrated in one portion of the packing, the efficiency with which air is preheated in the firing cycle is reduced. It is an object of the present invention to overcome these disadvantages.

U.S. Pat. Nos. 1,836,412 and 2,813,708 relate to modifying the flow patterns in regenerators. Both employ rigid baffles designed primarily for the purpose of rendering the air flow through the checker packing more uniform during the firing cycle. It is not apparent, however, how such arrangements could sufficiently influence flow in the opposite direction through the packing during the exhaust cycle to avoid concentrating heat at the flue end of the packing. Moreover, such baffle arrangements could change the gas flow pattern in the space beneath the packing during the exhaust cycle, thereby promoting lateral flow of the exhaust gases along the plenum above the packing and then into the packing at the flue end.

PRIOR ART

In U.S. Pat. No. 4,047,560 to Tsai it has been suggested that the difficulty of overheating of the upstream portion of the packing of the regenerator be minimized by the use of a movable baffle beneath the packing near the flue entrance to the regenerator. The baffle would deflect a substantial portion of the incoming airflow during the firing cycle into the portion of checker packing nearest the flue and thereby preferentially cool that portion. When the cycle is reversed, the baffle would be retracted so as to not interfere with normal gas flow pattern. Since the flue end of the packing will thereby have been cooled more than the other portions during the firing cycle, the subsequent uneven flow of the exhaust gases will not cause an excessively unbalanced temperature raise at the flue end. Thus the inordinate concentration of the heat at the flue end is reduced and thermoenergy more efficiently utilized. It is also suggested in U.S. Pat. No. 4,047,560 that baffles would also be placed in the plenum above the packing so as to discourage lateral flow along the plenum during the exhaust cycle thereby alleviating the channeling of the exhaust gases to the packing of the flue end. The baffles in the plenum would be permanent. The construction utilizing a movable baffle while effective in minimizing the problem of overheating of the upstream checker portion does not completely effectively make possible the utilization of the maximum heat exchange capacity of the entire checker system. Futher baffles in the upper plenum while restricting somewhat the flow of gases in the plenum also limit the firing arrangements which may be effectively made in the furnace as the air supplied to the burners is limited by the plenum baffles. Another disadvantage of the system of U.S. Pat. No. 4,047,560 is that the movable baffle requiring adjustment for each change of firing cycle presents a difficult materials usage in view of the size of the plate which must be moved and the reducing and oxidizing atmospheres to which it is subjected. Further, failure of the moving mechanism can create difficulties in overheating of the checkers in certain portions.

Therefore, there remains a need for a regenerator design which will provide even high temperature heating of the regenerator checkers for maximum heat recovery. As set forth above the flow over the checkers is not uniform. Therefore, less heat may be recovered from the downstream checkers than the upstream checkers as the variation in heat of these checkers between the firing cycles is less. There remains a need for a method of flue design that would allow maximum recovery of regenerator heat and at the same time eliminate the possibility of over heating portions of the checker system. Futher, there is a need for flue design which would not be blocked by a collapse of an arch holding the checker packing above the flue.

SUMMARY OF THE INVENTION

It is therefore an object of this invention to overcome the disadvantages of the prior regenerators.

It is a further object of this invention to provide a more efficient glass furnace.

It is an additional object to protect regenerator checker packings from collapse.

It is another object of this invention to provide even temperatures along the length of regenerator packings.

It is another object of this invention to provide a system of gaseous flow control in regenerator packings that does not require regulation between intake and exhaust cycles of the furnace.

It is a further additional object of this invention to increase the amount of heat which may be recovered and utilized by regenerator packings.

These and other objects of the invention are generally accomplished by the provision of a second bypass flue joining the main flue at points at each end of the air distribution space below the regenerator packing. Further the flue of the invention has a baffle in the primary flue between the point where the second flue joins the first flue and the point where the first flue is in contact with the pervious regenerator packing.

In a preferred form of the invention the secondary bypass flue may be added to the regenerator structure of an existing furnace such that the benefits may be derived without substantial structural modification of the existing furnace. The second bypass flue joins the main flue at a point prior to where the main flue contacts the pervious regenerator packings and then is also joined to the main flue at the downstream end of the packings. The secondary flue also has a baffle and a baffle is installed in the main flue between the point of first contact with the second flue and the portion of the main flue that is in contact with the regenerator packings.

DETAILED DESCRIPTION OF THE INVENTION

The construction and operating method of the regenerator of the invention allows numerous advantages over present conventional construction. Among other advantages are that it prevents overheating of checker packing by the concentration of airflow through the checkers. Further it does not require adjustment between exhaust and intake cycles of any devices in the flue. Another advantage is that by allowing greater heat recovery in the checker packing a better fuel efficiency and greater output of glass may be obtained in the furnace. Further the efficiency of the furnace is improved by the additional heat capacity of the checkers as that fuel efficiency is gained. A further understanding of how these advantages are achieved will become apparent from the description of the drawings below.

Figure 1A:
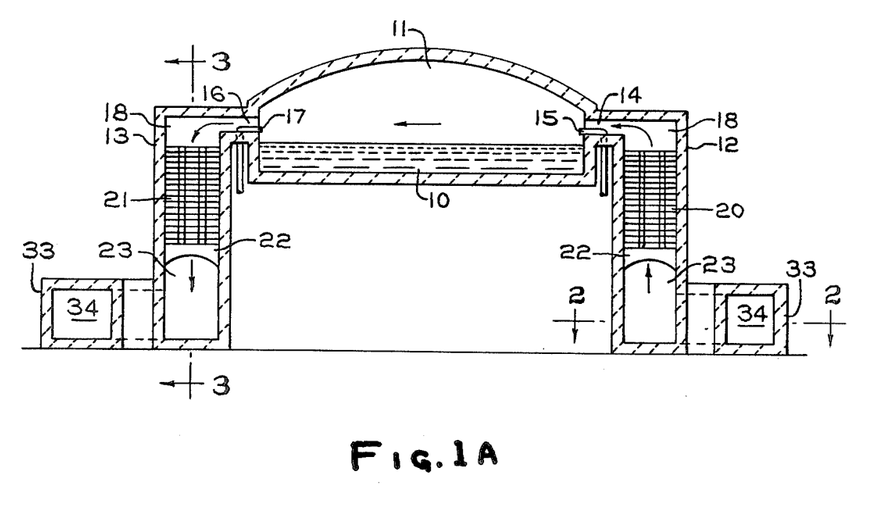
FIG. 1A is a schematic, vertical section across the width of cross-fired, regenerative, glass melting furnace showing a preferred location of the second bypass flue.
Figure 1B:
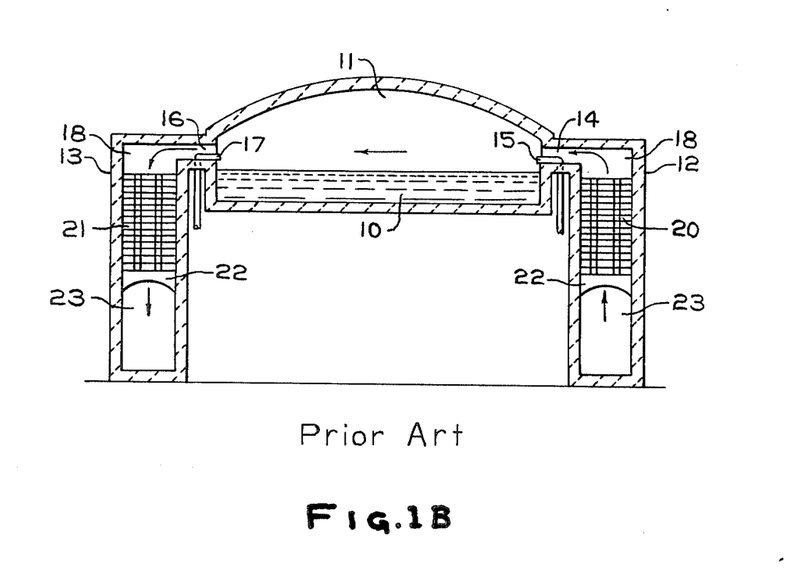
FIG. 1B is a schematic, vertical section across the width of a cross-fired, regenerative, glass melting furnace of the prior art.

The regenerative furnace shown in FIG. 1B is typical of the melting furnaces used in the flat glass industry. It should be understood that while glass furnaces are being described as illustrative examples, the invention is applicable to regenerative furnaces of other types. In FIG. 1B, a pool of molten and partially melted glass 10 is contained in a melting zone 11 which also serves as the combustion chamber. Regenerators 12 and 13 flank the combustion chamber and communicate therewith by means of a plurality of burner ports 14 and 16, respectively. Fuel is supplied by pipes 15 or pipes 17. Air for combustion passes upwardly through regenerator 12, where it is preheated by passing over a hot, gas-pervious, brickwork checker packing bed 20 made of refractory materials, and then through ports 14 where it combines with fuel from the pipe 15 at the mouth of each port. Flames issue a considerable distance into combustion chamber 11, and hot exhaust gases pass through ports 16 and into the opposite regenerator 13, where the exhaust gases heat another brickwork checker packing 21. The mode of operation shown in FIG. 1B is a firing cycle with respect to regenerator 12 and an exhaust cycle with respect to regenerator 13. After several minutes of operation, the flows are reversed so that regenerator 13 serves to preheat combustion air, and flames issue from left to right from ports 16 in FIG. 1B. Regenerator 12 would then be in an exhaust cycle. After a few more minutes the direction of firing is again reversed, and so on.

Figure 4A:
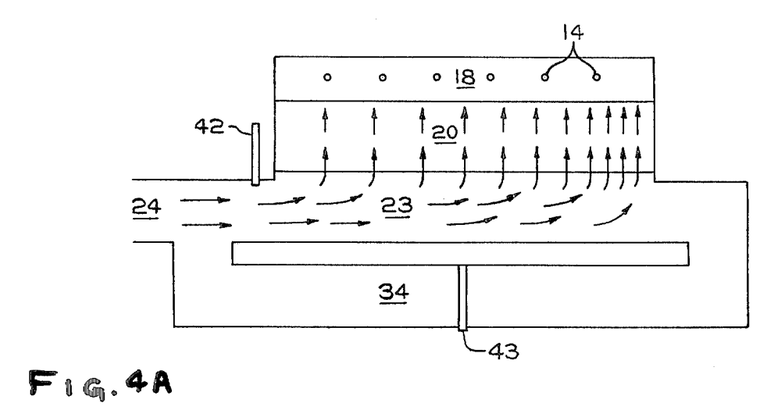
FIGS. 4A, 4B, and 4C are representative schematic drawings of the gaseous flow during the intake cycles of a regenerator with differing settings of the baffles of the first and second flues.
Figure 5A:
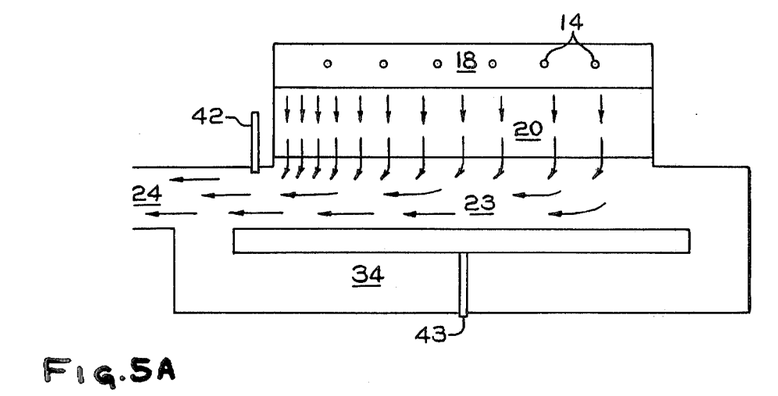
FIGS. 5A, 5B and 5C represent schematic drawings of the gaseous flow during the exhaust cycle of a glass furnace of the invention with differing settings of the baffles.

Typical flow patterns through the checker packing prior to the present invention may be seen in FIGS. 2 and 3, of U.S. Pat. No. 4,088,180 hereby incorporated by reference, where lengthwise cross-sections of regenerator 12 are shown. FIGS. 4A and 5A of the instant application also show the gas flow similar to that in a conventional regenerator. It can be seen there that checker packing 20 rests upon arches 22, leaving an air distributing space 23 below, which is open at one end to a flue 24. A plenum 18 above the packing communicates with a number of burner ports 14. The regenerator is shown serving seven burner ports, a typical number in a large flat glass melting furnace, but the number could be greater or smaller. FIG. 2 of U.S. Pat. No. 4,088,180 depicts an approximation of the flow pattern during an exhaust cycle without the improvement of the present invention. A portion of the exhaust gases tend to be drawn laterally along the plenum, toward the flue end of the regenerator, and then down into the packing near the end. The resulting greater amount of exhaust gas flowing through the flue end of the packing causes that portion of the packing to become hotter than the remainder of the packing. However, in the firing cycle when flows are reversed FIG. 3 of U.S. Pat. No. 4,088,180, the air flow through the packing, and therefore the cooling effect, has been found to be somewhat biased toward the opposite end from the flue. As a result, the checker packing near the flue end has been found to continually remain at a higher temperature than the rest of the packing. The region of this inefficient and sometimes harmful concentration of heat is, of course, not discrete, and it depends upon the particular configuration of a regenerator, but it can be said to generally consist of about the first one-third of the packing from the flue end.

Figure 6:
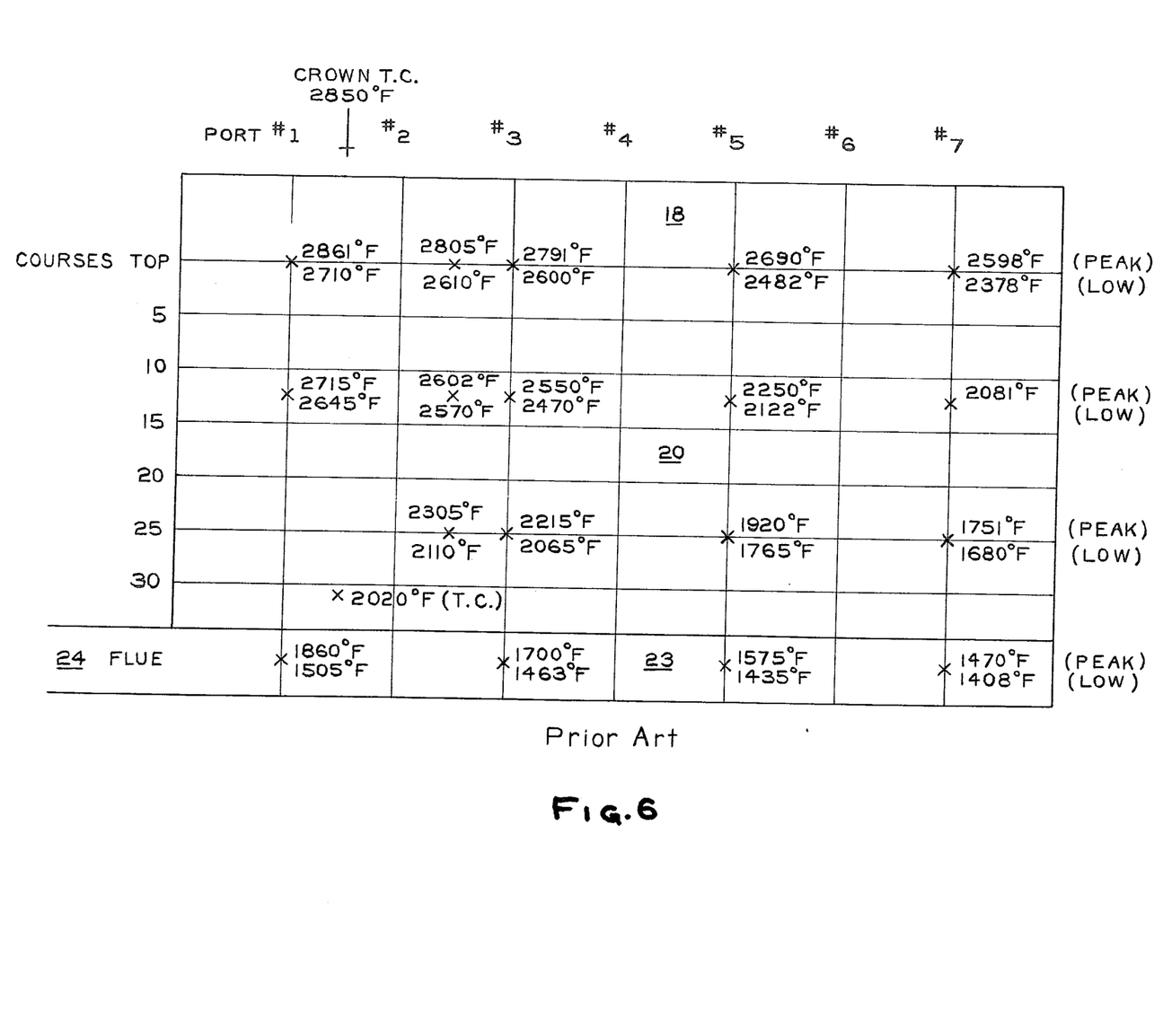
FIG. 6 is a vertical fragmentary schematic cross-section of the regenerator of a glass furnace of the prior art indicating the temperatures in the regenerator.

FIG. 6 shows an example of the thermocouple temperature readings of a seven port regenerator of the prior art having approximately the same geometric configuration as that shown in the figures. It can be seen from FIG. 6 that the temperatures at the flue end continually remain higher than any other portion of the regenerator. In fact, the minimum temperature $\frac{1}{3}$ the height below the first port is even higher than the maximum temperatures for most portions of the packing.

Figure 2:
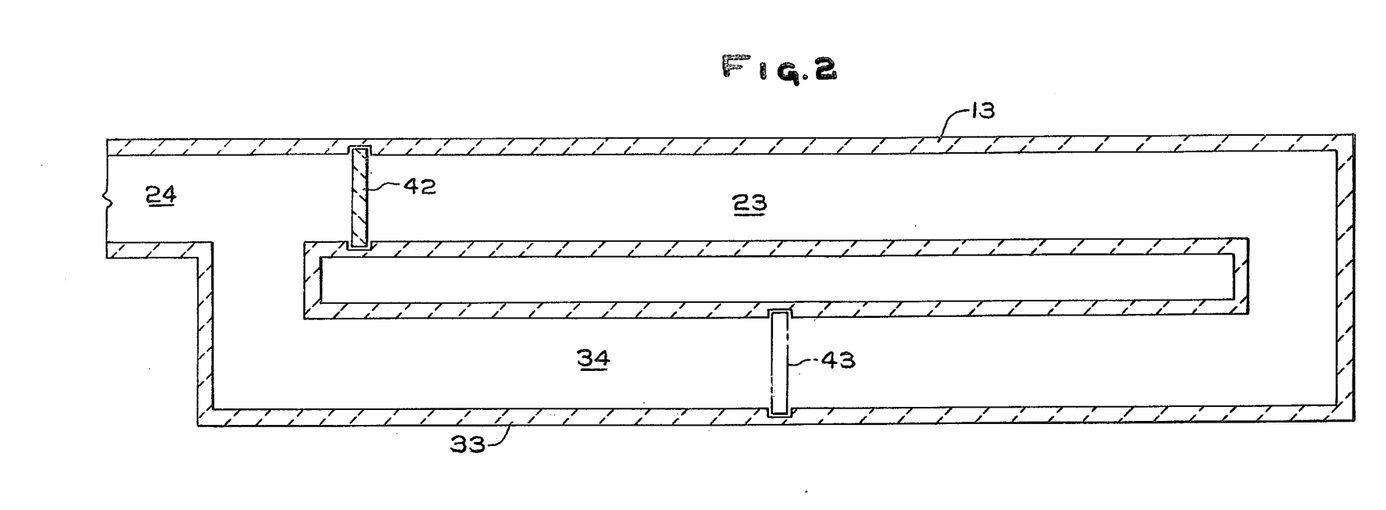
FIG. 2 is a horizontal cross-section of the flue section of a regenerator taken along the line 2—2 of FIG. 1A.
Figure 3:
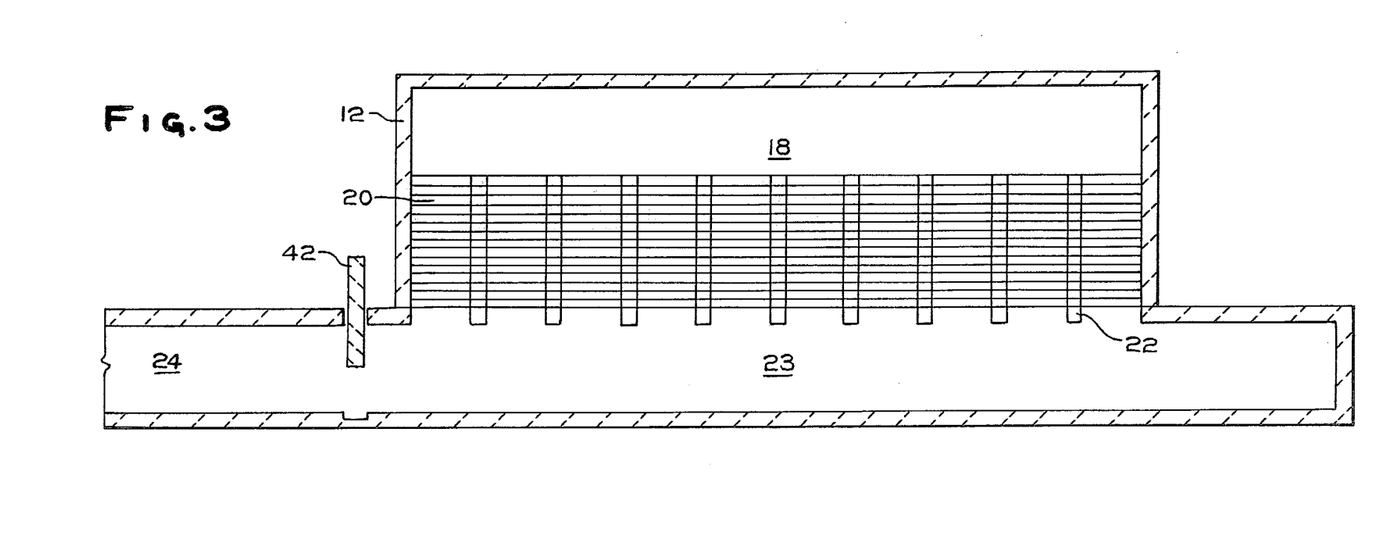
FIG. 3 is a vertical section of a regenerator according to the invention taken along line 3—3 of FIG. 1A.

In accordance with the regenerator of the invention as shown in FIG. 1A, FIG. 2 and FIG. 3. The regenerator flue system of the invention comprises the addition of a second bypass flue joining the main flue 24 at a point prior to the contact of the main flue 24 with the regenerator at 23. The secondary bypass flue 34 then extends to the downstream end of the regenerator or checker packing. In this specification the term "checker packing" and "regenerator packing" are used interchangeably and are intended to refer to any heat exchange medium comprising a gas-pervious bed of refractory material through which the air for the intake and exhaust cycles of a furnace pass. Within the flue 24 between the point of contact with the second bypass flue and the portion 23 in contact with the regenerator packing is located a gas flow control means 42. As illustrated the gas control means 42 is a vertical cut-off or gate which may be dropped by a controlled amount by hoist means not shown into the flue to regulate the gas flow. Another gas control means 43 is illustrated in the second bypass flue 34. The gas control means 43 is illustrated as a vertically moving gate which may be inserted to a desired distance into the second bypass flue by hoist means not shown. While the control devices have been indicated as vertical moving gates or fences which are inserted into the gas flow the purpose could also be accomplished by utilization of horizontal gates or by using swinging baffles as in U.S. Pat. No. 4,088,180. However, such baffles are more complicated in operation and are not necessary for the instant process as the gas flow is not regulated by the flow devices for each regenerative cycle of the furnace. Devices such as shown or horizontal sliding gates are simple in operation and the materials problem is much simpler as they are not subject torsional forces. It is further within the concept of the invention that the gas flow control devices not be in the form of knives or gates but be stacks of refractory brick in the flue to cut down the cross section of a certain portion of the flue. Such stacks could be made and changed when desired through access holes in the flue. Use of such stacks rather than gates is considered possible after the needs of a particular furnace have been established and it is running at a constant throughput for a long period of time. While the barriers of the invention are referred to as movable it is understood that the invention comprehends barriers which are movable only with difficulty or which are not movable at a rapid rate.

Figure 4B:
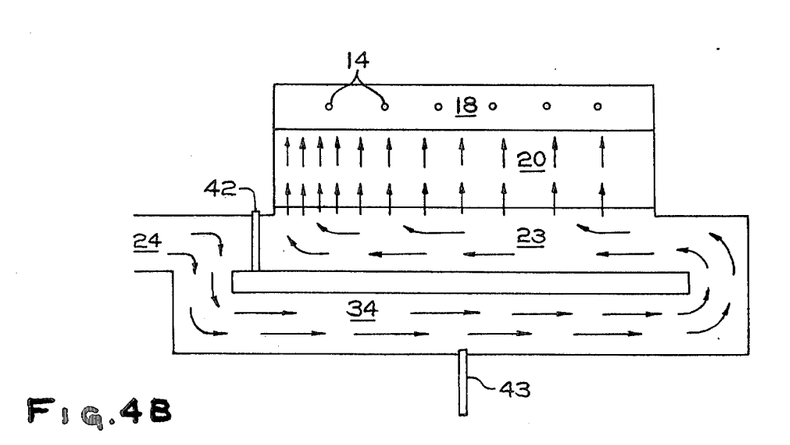
Figure 4C:
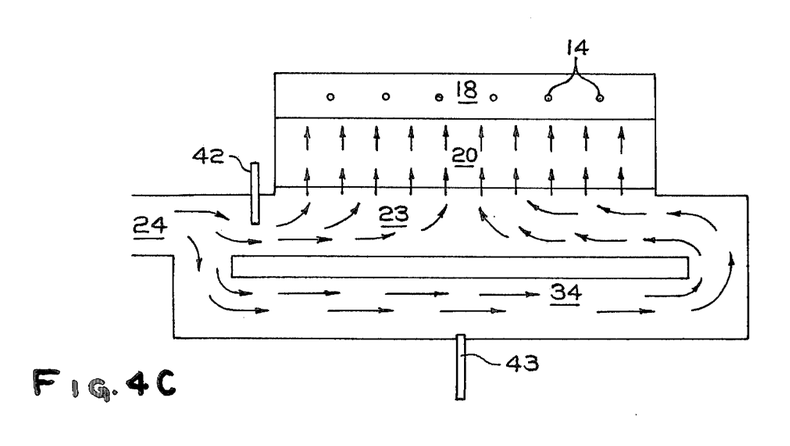

Illustrated in FIGS. 4A, 4B and 4C are the effects of changes in the position of control gates 42 and 43 during the intake or firing cycle of a regenerator. Illustrated in 4A is operation with the gate in the second bypass flue closed completely and the gate in the main flue between the bypass flue and the regenerator open completely. Operation illustrated there is similar to that obtained in the conventional furnace. Illustrated in 4B is operation with the gate 43 of the second bypass flue totally open and the gate 42 in the main flue between the secondary bypass and the regenerator totally closed. As illustrated the primary flow of gases in this system is in the upstream portion of the furnace. This would result in the greatest heat exchange of the upstream portion but inadequate heat exchange in the downstream area. Illustrated in FIG. 4C is flow with gate or damper 42 partially closed and damper 43 entirely open. Thus the flow of FIG. 4C illustrates generally even flow across the regenerator for maximum recovery of heat in the regenerator and even application of preheated combustion air to the ports. In certain instances it might be desirable to not have even flow across the regenerator. The instant system would allow regulation to achieve increased flow at either end or a generally even flow across the checkers. Uneven flow might be desirable in instances where the regenerator packing had more heat carrying capacity due to different materials at a certain portion or if baffles where present in the plenum 18 and heavier firing was being carried out at a certain portion of the furnace such as the initial three parts at the upstream end.

Figure 5B:
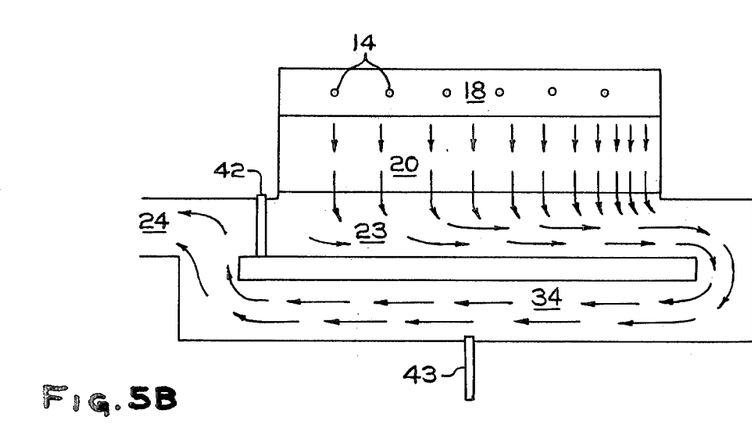
Figure 5C:
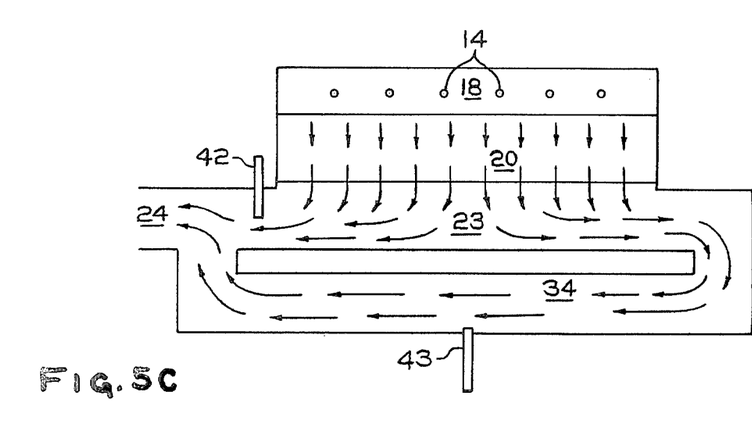

Illustrated in FIGS. 5A, 5B, and 5C are representations of gas flow during an exhaust cycle of the regenerator. As illustrated in FIG. 5A the gate of the second bypass flue is entirely closed while the gate of the primary flue between where the second flue joins and the regenerator surface is entirely open. As illustrated there the gas flow, as in conventional furnaces is concentrated at the upstream end of the furnace. The concentration of heat at the upstream end as above set forth can lead to collapse of a portion of the checkers due to overheating and also leads to less heat recovery. Illustrated in FIG. 5B is the gas flow with gate or damper 43 entirely open and gate 42 entirely closed. Gas flow here concentrates flow at the downstream end of the regenerator packings. Illustrated in FIG. 5C is an illustration where the flow has been balanced to be generally uniform across the regenerator area. Gate 42 is partially open while gate 43 is fully open to give an even flow rate across the regenerator. As stated above in regard to the firing cycles the instant system of gates allows regulation to concentrate flow in a certain area of the regenerator if desired. Such uneven flow across the regenerator might be desirable because of uneven heat storage ability of various materials in different portions of the regenerator or because of collapsing or plugging of a portion of the regenerator which could be compensated for by changing of the flow patterns by regulation of the gates.

It should be noted that in FIGS. 4C and 5C it is shown that the gates do not need to be adjusted between firing and exhaust to achieve generally even flow across the regenerator. Further, the gas flow regulating means in the second passageway may not be necessary if the second passageway is designed such that all desired regulation may be carried out with the regulating means in the flue.

FIG. 6 is an illustration of temperature measurements in the regenerative packing of a conventional glass furnace. Temperatures taken were the highest measurements and the lowest measurements during a complete firing and exhaust cycle. The upper figures are the highest temperature recorded and the bottom figure the lowest figure recorded. The review of the figures indicates a great need for improvement in the utilization of the regenerator system. The differences in temperature are substantial between the upstream and downstream portions of the regenerator. The directions "upstream" and "downstream" are defined by the direction of glass flow through the process; that is, glass flows from an upstream portion of the glassmaking apparatus toward a downstream portion of the apparatus. Even flow across the regenerator may serve to both lower peak temperatures for longer life and reduce the risk of collapse and allow the upgrading of refractories in what are now the lower temperature portions such that they have a greater heat capacity and can operate at higher temperatures. The increased heat of incoming air leads to greater firing efficiency with less fuel use.

It should be understood that although the system of the invention is illustrated with the main flue extending from the uptank end of the gas distribution space below the regenerator, it is not necessary for the invention that this location be used. It is also possible that the main flue join the downstream end of the regenerator or that the main flue enter the end of the gas distribution space at an angle to the longitudinal direction of the furnace and regenerator rather than parallel and in line with the space as shown. If the main flue was to enter at the downstream end of the gas distribution space, then the second by-pass flue would join at the upstream end of the gas distribution space.

Although this invention has been described with reference to particularly preferred embodiments, those skilled in the art will recognize that variations may be made in the practice of the invention. For instance, while the invention has been described with reference to float glass furnaces the concept is applicable to other regenerative firing furnaces such as those of steel making and bottle glass formation. Further, while the illustration of the second bypass flue has been beside the original flue it is also within the invention to place the secondary flue beneath the original flue. Further, although the flues have been shown of approximately equal size it of course would be possible to vary the sizes to suit different flow requirements of a particular furnace.

Accordingly this disclosure is intended to be illustrative rather than limiting. For instance, while the flues have been illustrated as of generally square construction they could be formed of rectanglular or circular cross-section if desired. The invention is intended to be defined by the claims attached hereto.

We claim:

1. In a regenerative furnace of the type comprising a combustion chamber, a pair of regnerator chambers, a plurality of burner ports spaced along elongated rows on opposite sides of the combustion chamber providing for the alternate passage of air and exhaust gases between the combustion chamber and the regenerator chambers, and fuel feeding means associated with each burner port, and in which each regenerator chamber includes a gas-pervious bed of refractory material extending along one side of one of said rows of burner ports, a plenum communicating with one side of said bed along its length and with one of said rows of burner ports, a gas distributing space communicating with the opposite side of said bed along its length, and a flue communicating with said gas distributing space at one end thereof, the improvement comprising: a bypass passage communicating with said flue adjacent to the junction of the flue with said one end of the gas distributing space, and communicating with the opposite end of said gas distributing space from said end in communication with said flue.

2. The furnace of claim 1 further comprising control means controlling gas flow in said flue in the area between the area of said flue's communication with said bypass passage and said communication with said gas distributing space.

3. The furnace of claim 2 or 1 further comprising control means to control gas flow in said bypass passage 4. The furnace of claim 3 wherein said bypass passage is added to an existing furnace.

* * * * *

Notice of Adverse Decision in Interference

In Interference No. 101,640, involving Patent No. 4,256,173, Y-W. Tsai and R. H. Duffus, TWO REGENERATOR-FLUE SYSTEM FOR REGENERATIVE FURNACES, final judgment adverse to the patentees was rendered Aug. 9, 1988, as to claims 1 - 4.

[*Official Gazette February 14, 1989.*]